United States Patent
Brickwedde et al.

(10) Patent No.: US 11,875,581 B2
(45) Date of Patent: Jan. 16, 2024

(54) METHOD FOR GENERATING A MONITORING IMAGE

(71) Applicant: Robert Bosch GmbH, Stuttgart (DE)

(72) Inventors: Fabian Brickwedde, Braunschweig (DE); Uwe Brosch, Algermissen (DE); Masato Takami, Hildesheim (DE); Gregor Blott, Salzgitter (DE)

(73) Assignee: ROBERT BOSCH GMBH, Stuttgart (DE)

( * ) Notice: Subject to any disclaimer, the term of this patent is extended or adjusted under 35 U.S.C. 154(b) by 197 days.

(21) Appl. No.: 17/370,331

(22) Filed: Jul. 8, 2021

(65) Prior Publication Data

US 2022/0019821 A1    Jan. 20, 2022

(30) Foreign Application Priority Data

Jul. 20, 2020  (DE) .................. 10 2020 209 024.6

(51) Int. Cl.
| | |
|---|---|
| *G06V 20/59* | (2022.01) |
| *G06T 7/11* | (2017.01) |
| *H04N 19/167* | (2014.01) |
| *G06V 20/52* | (2022.01) |
| *G06F 18/214* | (2023.01) |
| *G06F 18/2431* | (2023.01) |

(52) U.S. Cl.
CPC ............ *G06V 20/59* (2022.01); *G06F 18/214* (2023.01); *G06F 18/2431* (2023.01); *G06T 7/11* (2017.01); *G06V 20/52* (2022.01); *H04N 19/167* (2014.11); *G06T 2207/10016* (2013.01); *G06T 2207/20081* (2013.01); *G06T 2207/20084* (2013.01); *G06T 2207/30232* (2013.01); *G06T 2207/30268* (2013.01)

(58) Field of Classification Search
None
See application file for complete search history.

(56) References Cited

U.S. PATENT DOCUMENTS

| | | |
|---|---|---|
| 7,020,335 B1 | 3/2006 | Abousleman |
| 2003/0174773 A1 | 9/2003 | Comaniciu et al. |
| 2010/0265354 A1 | 10/2010 | Kameyama |
| 2011/0064267 A1* | 3/2011 | Cobb ................. G06V 20/52 |
| | | 382/103 |
| 2021/0209927 A1* | 7/2021 | Hedges ............... G08B 25/005 |
| 2021/0334607 A1* | 10/2021 | Al-Kofahi ........... G06V 10/776 |

* cited by examiner

*Primary Examiner* — Vikkram Bali
(74) *Attorney, Agent, or Firm* — NORTON ROSE FULBRIGHT US LLP

(57) ABSTRACT

A method for generating a monitoring image. The method includes: providing an image sequence of the surroundings to be monitored with the aid of an imaging system; determining at least one monitoring area and at least one periphery area of at least one image of the image sequence with the aid of a learning-based semantic segmentation method; compressing the monitoring area of the at least one image of the image sequence with a first compression quality; and compressing the periphery area of the at least one image of the image sequence with a second compression quality to generate the compressed monitoring image, the second compression quality being lower than the first compression quality.

12 Claims, 2 Drawing Sheets

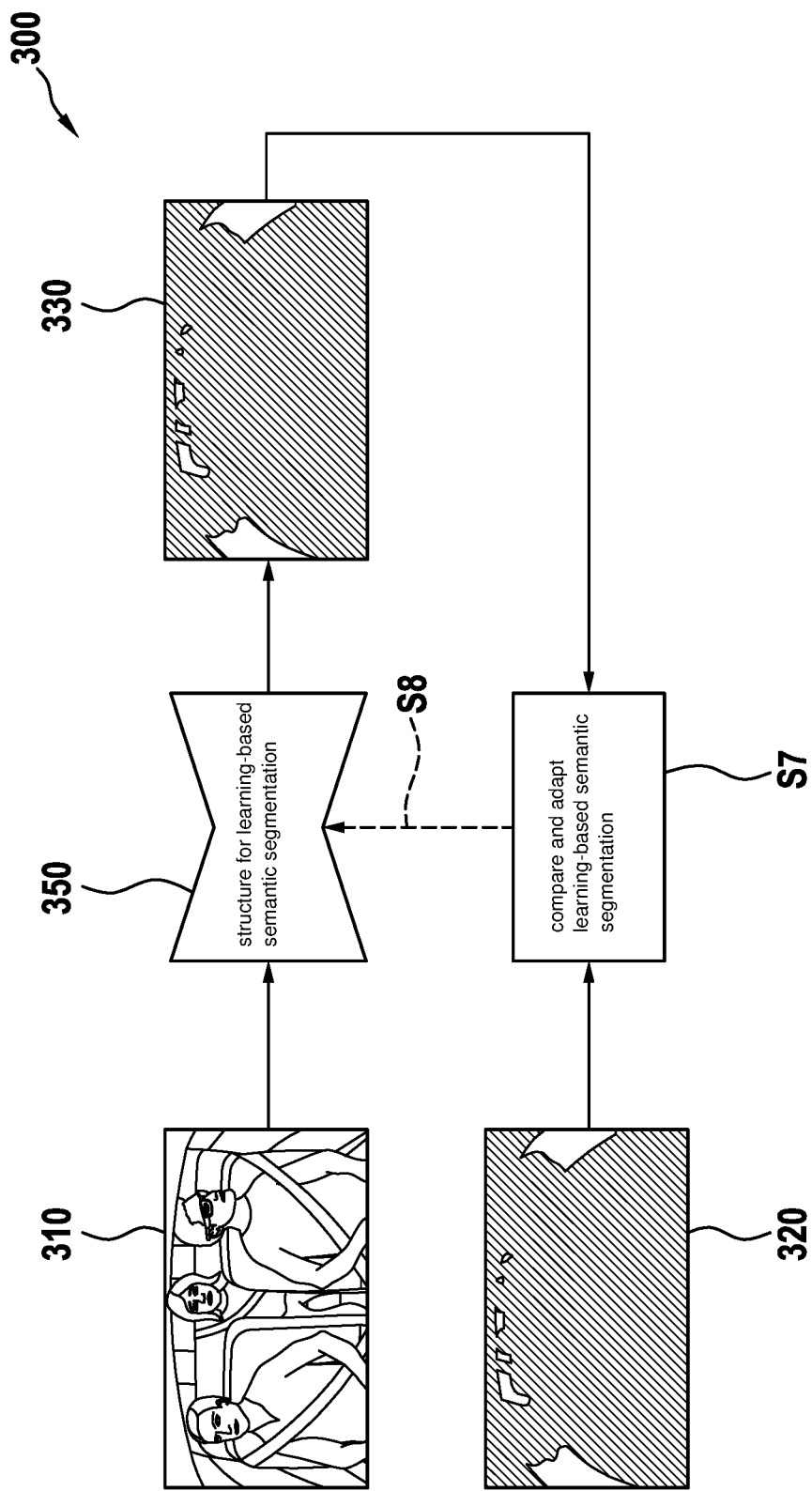

METHOD FOR GENERATING A MONITORING IMAGE

CROSS REFERENCE

The present application claims the benefit under 35 U.S.C. § 119 of German Patent Application No. DE 102020209024.6 filed on Jul. 20, 2020, which is expressly incorporated herein by reference in its entirety.

BACKGROUND INFORMATION

For a transfer of video data, compression methods may be used, in general, to reduce the data size of the videos. In this way, an economic efficiency for a transfer and storage of the videos may be improved. Depending on the intended purpose, different requirements may be placed on the compression methods. While videos for entertainment purposes, for example, are to look visually appealing, the requirement with regard to security videos is that essential pieces of information are to remain recognizable and uncorrupted.

In particular, a transfer of the video data via the mobile communication network as well as a size of a data memory, which has to be available on a device for storing the video data, are economically important factors during a video-based vehicle interior monitoring, for example by mobility providers such as car sharing, taxi or bus companies.

Conventional methods in the area of video encoding may be divided into two groups. The first group relates to general compression methods which are not designed to be application-specific and, for example, may also be used for encoding video films. Examples of this are the MPEG encoding or the H.264 and H.265 encoding methods.

With the aid of differential encoding, the fact that an image area may be derived from adjoining image areas is used to advantage. In this way, homogeneous image areas having a lower data volume may be encoded, for example. With the aid of a motion correction, a temporal component of the images may be taken into consideration, the change of image areas over the time being encoded or compressed for this purpose. In this way, the data volume may, in particular, be reduced for static image areas.

The second group relates to application-oriented compression methods for videos, for example in the area of monitoring or surveillance systems. These methods additionally utilize application-specific properties, such as for example that only certain areas in the image supply relevant pieces of information for the monitoring. For example, in particular moved road users are of interest in the field of traffic monitoring systems, and the static background is largely irrelevant for these tasks. With these methods, a detection of relevant areas is based on an identification of moved objects or a detection of changes compared to the background or a manual specification of static image areas.

SUMMARY

An increase in the compression or a reduction in the data size is required for economically advantageous reasons, in particular, for the transfer and storage of such video files, for example in a cloud, without impermissibly decreasing a necessary quality in areas of relevant pieces of information in the process. In the process, it may also be taken into consideration that, during certain applications, areas of the videos are to be made unrecognizable for data protection reasons.

A corresponding compression of video data may, in general, be used for surveillance or for a monitoring of surroundings and, in particular, with respect to a vehicle interior monitoring, it may be used for applications in the area of car sharing, ride hailing, or for taxi companies, for example to avoid criminal acts or automatically or manually identify these.

Certain areas are of minor interest for the vehicle interior monitoring, such as for example a window area or a vehicle exterior.

According to aspects of the present invention, a method for generating a monitoring image, a method for training a learning-based semantic segmentation method, a method for providing a control signal, a monitoring device, a computer program, and a machine-readable memory medium are provided. Advantageous embodiments disclosed herein.

In this entire description of the present invention, the sequence of method steps is represented in such a way that the method is easily comprehensible. Those skilled in the art, however, will recognize that many of the method steps may also be run through in a different order and lead to the same or a corresponding result. Within this meaning, the order of the method steps may be changed accordingly. Some features are denoted by numerals to improve the readability or to render the assignment clearer; however, this does not imply a presence of certain features.

According to one aspect of the present invention, a method for generating a monitoring image is provided. In accordance with an example embodiment of the present invention, the method includes the following steps:

In one step, an image sequence of the surroundings to be monitored is provided with the aid of an imaging system. In a further step, at least one monitoring area and at least one periphery area of at least one image of the image sequence are determined with the aid of a learning-based semantic segmentation method. In a further step, the monitoring area of the at least one image of the image sequence is compressed with a first compression quality. In a further step, the periphery area of the at least one image of the image sequence is compressed with a second compression quality to generate the compressed monitoring image, the second compression quality being lower than the first compression quality.

Using this method for generating a monitoring image, it is possible to compress irrelevant areas of an image of the image sequence with a considerably lower quality and necessary data rate for transfer, while it continues to be possible to compress the relevant areas with high quality. The areas which are compressed with a lower quality may be mapped onto the image using a mask to carry out the corresponding compression with the first and/or second compression quality. These areas for the monitoring or the periphery are thus advantageously dynamically adapted to the content of the particular images of the image sequence.

With these methods, for example, an image area in front of windows or a vehicle exterior, in front of which, however, passengers are situated in the vehicle interior, continues to be compressed with higher quality, in contrast to static masks of other methods for compression.

As an alternative to the pixelwise output, the monitoring areas and/or periphery areas may be determined and defined in the form of a polygonal line or other geometric shape.

In example embodiments of the present invention, the method may be carried out on an embedded system of an imaging system, such as for example a camera, but may also be implemented using a cloud service. In the latter case, the images may be sent to the cloud, the calculation of the areas is carried out in the cloud, and thereafter the description of the monitoring and/or periphery areas is transferred to the embedded system. In this case, the areas would typically only very rarely be recalculated to keep the data traffic to the cloud low.

The use of the method for a vehicle interior monitoring and masking of the window/vehicle exterior areas shows the potential of reducing the data rate by 20% to 50% as a function of the camera, camera installation position, and recorded scenes. As a result of the image movement in the window area due to the vehicle's own movement, these are particularly data-intensive during the compression. Movements in the vehicle, for example due to persons, but also due to changes in the lighting/shading conditions, continue to be encoded with high quality.

The definition of the periphery area as a window area shall be understood to be exemplary. In addition, the method may be used during a use of the method for vehicle interior monitoring, for example to additionally assign the visible area of the seats to the periphery area.

The compression of the monitoring area and of the periphery area with different compression qualities may take place using compression methods which support the compression of areas with different qualities.

In addition, the method described here may be used with any arbitrary encoding method for compression, such as, e.g., MPEG, H.264, H.265, and does not necessitate resorting to proprietary encoding methods. The data reduction is achieved by preprocessing the video image in such a way that, for example, the properties of the differential encoding and motion correction of these methods are used to advantage. For example, the periphery area in the image may previously be low pass-filtered.

For the determination of the monitoring area and periphery area, learning-based semantic segmentation methods may be implemented with the aid of a trained neural convolutional network, which, if necessary, are structured in combination with fully connected neural networks, if necessary utilizing traditional regularization and stabilization layers such as batch normalization and training dropouts, utilizing different activation functions such as sigmoid and ReLU, etc. In addition, traditional approaches such as support vector machines, boosting, decision trees as well as random forests may also be used for implementing a learning-based semantic segmentation method, and thus for the described method.

Such a semantic segmentation may determine, with a high accuracy, a pixelwise classification of image contents in semantic classes, which may then be assigned to the monitoring area and/or the periphery area.

In neural networks, the signal at a connection of artificial neurons may be a real number, and the output of an artificial neuron is calculated by a non-linear function of the sum of its inputs. The connections of the artificial neurons typically have a weight which adapts with progressing learning. The weight increases or decreases the strength of the signal at a connection. Artificial neurons may have a threshold so that a signal is only output when the overall signal exceeds this threshold.

A plurality of artificial neurons is typically combined in layers. Different layers possibly carry out different types of transformations for their inputs. Signals migrate from the first layer, the input layer, to the last layer, the output layer, possibly after passing through the layers multiple times.

The architecture of such an artificial neural network may be a neural network which, if necessary, is expanded by further, differently designed layers. Such neural networks basically include at least three layers of neurons: an input layer, an intermediate layer (hidden layer), and an output layer. This means that all neurons of the network are divided into layers.

In the process, no connections to preceding layers are implemented in feed forward networks. With the exception of the input layer, the different layers are made up of neurons which are subject to a non-linear activation function and may be connected to the neurons of the next layer. A deep neural network may include many such intermediate layers.

Such neural networks have to be trained for their specific task. In the process, each neuron of the corresponding architecture of the neural network, e.g., receives a random starting weight. Then, the input data are entered into the network, and each neuron may weigh the input signals with its weight and forwards the result to the neurons of the next layer. The overall result is then provided at the output layer. The magnitude of the error may be calculated, as well as the share of every neuron in this error, to then change the weight of every neuron in the direction which minimizes the error. Then, recursive pass-throughs, renewed measurements of the error, and an adaptation of the weights take place until an error criterion is met.

Such an error criterion may be, e.g., the classification error on a test data set, or also an instantaneous value of a loss function, for example on a training data set. As an alternative or in addition, the error criterion may relate to an abort criterion as a step in which, during the training, an overfitting would begin or the available time for the training has lapsed.

The definition of the monitoring area and periphery area may be predefined with the aid of labeled reference images or ground truth labels of the training data, by which a flexible definition of the application-specific relevant or non-relevant areas is made possible. The neural network may be trained to the effect that the monitoring area and periphery areas are determined for arbitrary images, in particular for images of the same application area.

The optical image is provided in digital form to the trained neural network as an input signal.

In particular, individual images without a division into a monitoring area and a periphery area and the corresponding compression may be stored and/or transferred.

In accordance with example embodiments of the present invention, an imaging system may be a camera system and/or a video system and/or an infrared camera and/or a system for distance determination.

As an alternative or in addition, these systems may be used to determine a monitoring area and/or a periphery area for a monitoring image.

For example, a vehicle exterior may be easily determined using a system for distance determination, large ranges or distances implying a vehicle exterior. For example, an infrared camera may identify creatures based on a temperature determination. The method for generating a monitoring image may determine an optical flow of images of a camera system and/or video system for the determination of the monitoring area and/or periphery area, the flow vectors for the vehicle exterior corresponding to the epipolar geometry of the vehicle's own motion.

In particular, the determination of the monitoring area and/or of the periphery area may be supported by a level set method in which segmented areas are tracked over the time.

In addition to the use for monitoring vehicle interiors, the method described here for generating monitoring images may also be used for monitoring cameras or dash cams, as well as for any uses which send video data to a cloud, for example for a use in the field of Internet of Things (IoT) and/or building technologies (BT).

In other words, learning-based methods for segmentation are used with this method to estimate masks for the determination of a monitoring area and/or a periphery area. The definition of the masks is predefined with the aid of labeled reference images or ground truth labels of the training data, which enables a flexible definition of application-specific relevant or non-relevant areas. The masks typically have a semantic meaning, such as e.g., a window or a vehicle exterior. This learning-based method is additionally able to achieve a high robustness with respect to changes of the image intensities, such as, e.g., a change in the lighting conditions, at consistent image content.

This learning-based method may be generalized in that unseen scenes of the same domain with respect to the areas may be determined, even if the exact scene is not part of the training data. For example, the method may be used in different and unknown vehicle interiors for determining the masks, for a window and/or a vehicle exterior, for example, without an additional calibration for the new vehicle being necessary.

The learning-based method may continuously calculate new masks and adapt to changes of the image content. In this way, it may be taken into consideration, for example, that a passenger, whose behavior is to be monitored, moves into an image area in which a window is situated, the window otherwise being assigned to a periphery area.

In the process, only the areas which are semantically assigned to the periphery area are compressed with a lower data rate and quality. Relevant image contents of the monitoring area are compressed with consistently high quality.

According to one aspect of the present invention, it is provided that at least one masking area is determined with the aid of the learning-based semantic segmentation method, and the monitoring image is generated in that pixel values in the at least one determined masking area of the monitoring image are assigned predefined pixel values. Using such a masking area, it is possible to make areas of the image of the image sequence unrecognizable, for example to provide anonymized data or images or to meet data protection rules. For data protection reasons, it may be necessary to make persons and license plates unrecognizable, if necessary. While persons in the interior of a vehicle possibly have consented to the recording, for example by agreeing to general terms and conditions, this may not be ensured for persons in the exterior, for example. As an alternative or in addition, the masking areas may be made unrecognizable by blacking out and/or blurring.

According to one aspect of the present invention, it is provided that a mask for a particular image is generated S3 with the aid of the monitoring area and/or periphery area of the particular image, and the monitoring image is generated based on an averaged multitude of masks of a corresponding multitude of respective images of the image sequence. In particular, a filtered and/or smoothed mask for the image of the image sequence may be generated from such a multitude of masks. An increase in a data rate, which may be attributed to a temporally high-frequency change of the mask edges, may be prevented both by averaging across the multitude of masks and by filtering and/or smoothing the mask. In particular, a particular mask may be smoothed more strongly at its edge to reduce high-frequency changes at the mask edges.

As an alternative or in addition, the edge of a mask may be transitioned smoothly into the unmasked portion of the image, for example by alpha blending, to suppress high-frequency changes at the transition, and thereby reduce the complexity for the compression.

As an alternative or in addition, the semantic segmentation of the image may be combined with other methods, for example in that a person classifier, for example in the form of bounding boxes and/or person masks and/or person keypoints, are used to preclude during the semantic segmentation that persons depicted in the particular image are assigned by masking to the periphery area.

As an alternative or in addition, the semantic segmentation may be subjected to a plausibility check, for example by ignoring very small mask segments, or model assumptions may be integrated into the semantic segmentation or into the establishment of a monitoring area and/or periphery area. With the aid of such model assumptions, it is generally possible, for example, to define previously established areas of the image as a monitoring area and/or periphery area.

The determined monitoring areas and/or periphery areas may be post-processed, for example by approximating the edge of the corresponding areas for masking the edges in the image to improve the determination of the corresponding areas.

According to one aspect of the present invention, it is provided that the learning-based semantic segmentation method is carried out based on a trained neural convolutional network and/or an aggregate channel features method and/or an AdaBoost method. While a neural convolutional network includes both the feature extraction and classification, the convolutional network or parts of the convolutional network may be replaced with other methods. For example, the aggregate channel features method supplies feature vectors which may, among other things, represent gradients and color channels in adjoining image areas. The selection of the calculation of the feature vectors may instead also be predefined by a learning-based method. A classification decision based on a given feature vector may, for example, take place and be learned using the AdaBoost method.

According to one aspect of the present invention, it is provided that the surroundings to be monitored are a vehicle interior.

According to one aspect of the present invention, it is provided that the monitoring image is formed with the aid of the compressed monitoring area and the compressed periphery area.

In this way, the method for generating the monitoring image may be compressed using application-specific compression methods. These compression methods support the compression of defined areas with a different quality. The corresponding areas for the monitoring or periphery are thus determined without use of an additional masking. This may be formulated as a classification problem using a two-class problem including a relevant monitoring area and a non-relevant periphery area.

According to one aspect of the present invention, it is provided that the periphery area of the at least one image of the image sequence is compressed with the second compression quality in that the at least one periphery area is softened and/or assigned predefined pixel values for image pixels of the periphery area before the periphery area is compressed with the first compression quality using a compression method.

In this way, both the monitoring area and the periphery area are compressed using a single compression method which generates a first compression quality, by which the method is simplified.

By blacking out and/or blurring image areas, the required data rate for the compression when using general encoding methods is reduced. This is due to the properties of the differential encoding and motion correction. As a result, the method has no limitation of the encoding or compression method to be used; however, the degree of the reduction may vary.

Strong blurring instead of blacking out image areas has the advantage that, due to the blurring of the periphery areas, the monitoring image thus compressed is compressed to be considerably smaller, but at the same time, due to the nonetheless visible information in the blurred or softened image area, the masking results in a higher acceptance by an observer.

According to one aspect of the present invention, it is provided that the periphery area of the at least one image of the image sequence is compressed with the second compression quality by replacing the at least one periphery area with a predefined image content. In the process, the predefined image content may be derived from the original image of the image sequence and/or the corresponding image area may be assigned a uniform color which is assigned to the pixels of the monitoring image.

For example, a window area of the image which was determined as the periphery area may also be assigned the same area from another image of the video.

According to one aspect of the present invention, it is provided that at least two areas in at least one image of the image sequence are determined with the aid of the learning-based semantic segmentation method, to each of which different compression qualities and/or compression properties and/or properties of the image processing are assigned.

In this way, graduated quality levels, such as, e.g., low quality, if necessary blacked out, average quality, for example blurred, and high quality may be assigned to more than two areas and/or different properties for the compression may be assigned to the areas.

According to one aspect of the present invention, it is provided that at least one monitoring area and at least one periphery area are determined from a plurality of images of the image sequence with the aid of the learning-based semantic segmentation method.

This plurality may be determined by determining at least one monitoring area and at least one periphery area from images of the image sequence on a regular basis with the aid of the learning-based semantic segmentation method. In particular, at least one monitoring area and one periphery area may be determined from each image of the image sequence with the aid of the learning-based semantic segmentation method. In addition, at least one monitoring area and at least one periphery area may be determined with the aid of the learning-based semantic segmentation method, as a function of a certain image content of the image of the image sequence and/or of another detected event.

According to one aspect of the present invention, it is provided that image areas of the particular images are segmented into a plurality of object classes with the aid of the learning-based semantic segmentation method, and the monitoring area and/or the periphery area is/are determined by assigning the image areas to the at least one monitoring area based on a first group of object classes, and by assigning image areas to the at least one periphery area based on a second group of object classes. In the process, the semantic segmentation may thus correspond to multiple classes, such as for example windows, seats, persons, or objects. A logic may define the monitoring areas and/or periphery areas using the classes.

Based on a first and/or second group(s) of object classes, an inverse assignment to the monitoring area and/or periphery area may also take place. This means that, if the object class were to be assigned to the monitoring area, the periphery area may be determined thereby, and accordingly a monitoring area may be determined for object classes of the periphery area.

According to one aspect of the present invention, it is provided, in addition or as an alternative to the learning-based semantic segmentation method, that further input data are provided by at least one infrared camera and/or from distance measurements and/or further image-based variables, such as an optical image flow, and these further input data determine the periphery and/or monitoring area(s) with the aid of a learning-based or model-based method.

In accordance with an example embodiment of the present invention, a method for training a learning-based semantic segmentation method corresponding to one of the above-described methods for determining at least one monitoring area and at least one periphery area of at least one image of an image sequence is provided. The method for training includes a plurality of training cycles, for which a plurality of corresponding reference images of surroundings to be monitored, which are generated using an imaging system, are provided. In the process, a particular reference image is assigned to a particular training cycle, and each training cycle includes the following steps:

In one step, the particular reference image is provided, at least one monitoring area and at least one periphery area being labeled in the particular reference image. In one further step, the learning-based semantic segmentation method is adapted to minimize a deviation from the particular labeled reference image, for example with the aid of a cross-entropy loss, during the determination of at least one monitoring area and at least one periphery area of the particular reference image using the learning-based semantic segmentation method.

Using this method for training a learning-based semantic segmentation method, a trained semantic segmentation method may be provided which may be used in the above-described methods for generating a monitoring image.

Using this method for training a learning-based semantic segmentation method, the structures already described above, on which the learning-based semantic segmentation method is based, such as for example a neural convolutional network or support vector machines, boosting, decision trees as well as random forests, may be trained.

In the process, the adaptation of the learning-based semantic segmentation method may take place in the form of an adaptation of parameters of the semantic segmentation method, such as for example by adapting the parameters of a neural convolutional network.

Reference images are images which, in particular, were specially recorded for training a machine learning system, such as a structure for a learning-based semantic segmentation method, and, for example, were manually selected and annotated or were synthetically generated, and in which the multitude of the areas is labeled with respect to the classification of the areas. For example, such a labeling of the areas as a monitoring area and a periphery area may correspondingly take place manually.

In accordance with an example embodiment of the present invention, a method is provided in which, based on a monitoring image which was generated according to one of the above-described methods, a control signal for controlling at least one semi-automated vehicle is provided, and/or, based on the monitoring image, a warning signal for warning, or for the intervention of a vehicle occupant is provided, and/or, based on the monitoring image, an emergency signal for alerting a private and/or public security service and/or rescue service is provided, and/or, based on the monitoring image, a control signal for controlling an at least semi-automated vehicle is provided, to bring the vehicle into a safe state/standstill.

Using the emergency signal, for example, the police and/or an ambulance or the fire department may be alerted.

With respect to the feature that a control signal, based on a monitoring image which was generated according to one of the above-described methods, is provided, the expression "based on" shall be understood in the broad sense. It shall be understood to mean that the monitoring image is used for any determination or calculation of a control signal, this not precluding that other input variables are also used for this determination of the control signal. This applies accordingly to the provision of a warning signal and/or an emergency signal. The determination of the signal may, for example, take place by further methods and/or persons, such as for example an operator in a monitoring center, for analyzing the scene content.

In accordance with an example embodiment of the present invention, a monitoring device is provided, which is configured to carry out one of the above-described methods. Using such a monitoring device, the corresponding method may be easily integrated into different systems.

In accordance with an example embodiment of the present invention, a use of one of the above-described methods for monitoring surroundings to be monitored is described, the surroundings being detected with the aid of an imaging system.

According to one aspect of the present invention, a computer program encompassing commands is provided, which, during the execution of the computer program by a computer, prompt the computer to carry out one of the above-described methods. Such a computer program allows the use of the described method in different systems.

In accordance with an example embodiment of the present invention, a machine-readable memory medium is provided, on which the above-described computer program is stored. With the aid of such a machine-readable memory medium, the above-described computer program is portable.

BRIEF DESCRIPTION OF THE DRAWINGS

Exemplary embodiments of the present invention are shown with respect to FIGS. 1 through 3 and explained in greater detail hereafter.

FIG. 3 shows a diagram for a training of a semantic segmentation method, in accordance with an example embodiment of the present invention.

DETAILED DESCRIPTION OF EXAMPLE EMBODIMENTS

Figure 1:
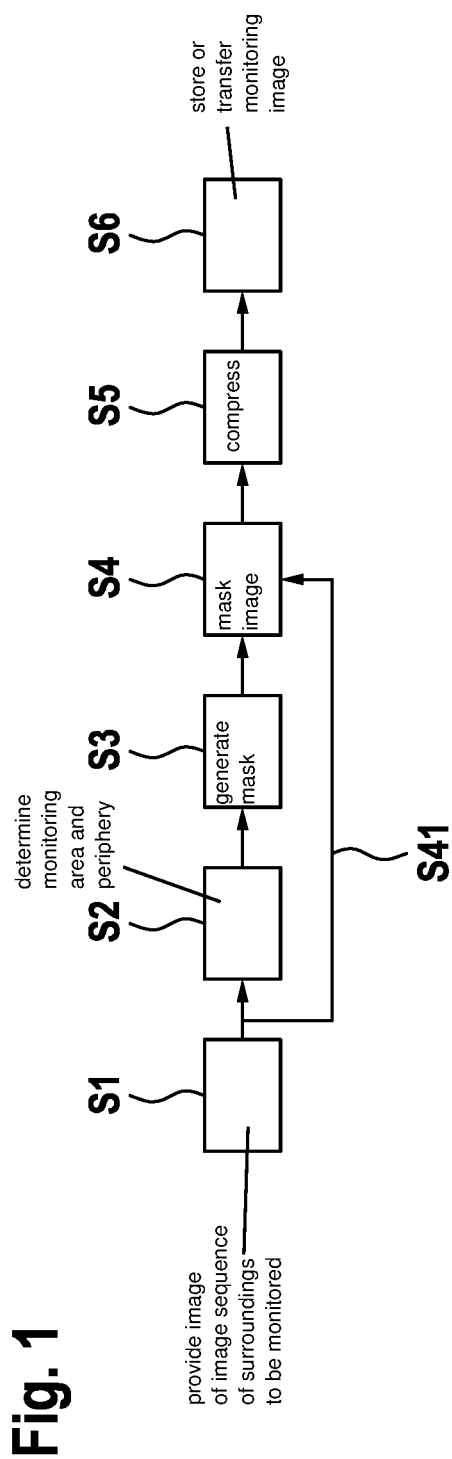
FIG. 1 shows a data flowchart for the method for generating a monitoring image, in accordance with an example embodiment of the present invention.

FIG. 1 schematically outlines the method for generating and transferring or storing a monitoring image. In a first step, an image of an image sequence of the surroundings to be monitored is provided S1 with the aid of an imaging system. In a second step, a monitoring area and a periphery area are determined S2 in at least one image of the image sequence with the aid of a learning-based semantic segmentation method. In a further step S3, a mask is generated, with the aid of which, in a further step S4, the at least one image may be masked in such a way that the periphery area may be compressed with a second compression quality, and the monitoring area may be compressed with a first compression quality. For this purpose, the periphery area may either be compressed with a lower compression quality and/or the periphery area may be compressed with a lower compression quality than the monitoring area by softening or assigning predefined pixel values in a subsequent step S5, in which a uniform compression for the monitoring area and the periphery area is applied. Thereafter, the generated monitoring image may be stored and/or transferred in a step S6. Using an optional step S41, additionally at least portions of an image of the image sequence may be used for masking the image by assigning portions or areas of the image to portions of the monitoring area and/or of the periphery area.

The described determination of the monitoring area and/or of the periphery area is continuously repeated to dynamically adapt to changes of the image content. Based on the estimated areas, the application-specific non-relevant areas are blacked out and/or blurred. This reduces the required data rate for the compression of the videos due to the encoding properties "differential encoding" and "motion correction." The reduced data rate results in lower costs, for example during the video transfer or video storage. A frequency of the calculation of the monitoring areas and/or periphery areas may be parameterized in the process. The calculation may be carried out for each image or for a subset, such as, e.g., for every xth image. In the second case, the previously determined areas would be further used for the compression until a new determination was carried out. In the second case, methods for tracking areas/segments, such as e.g., based on optical flow or level set methods, may additionally be used.

Figure 2:
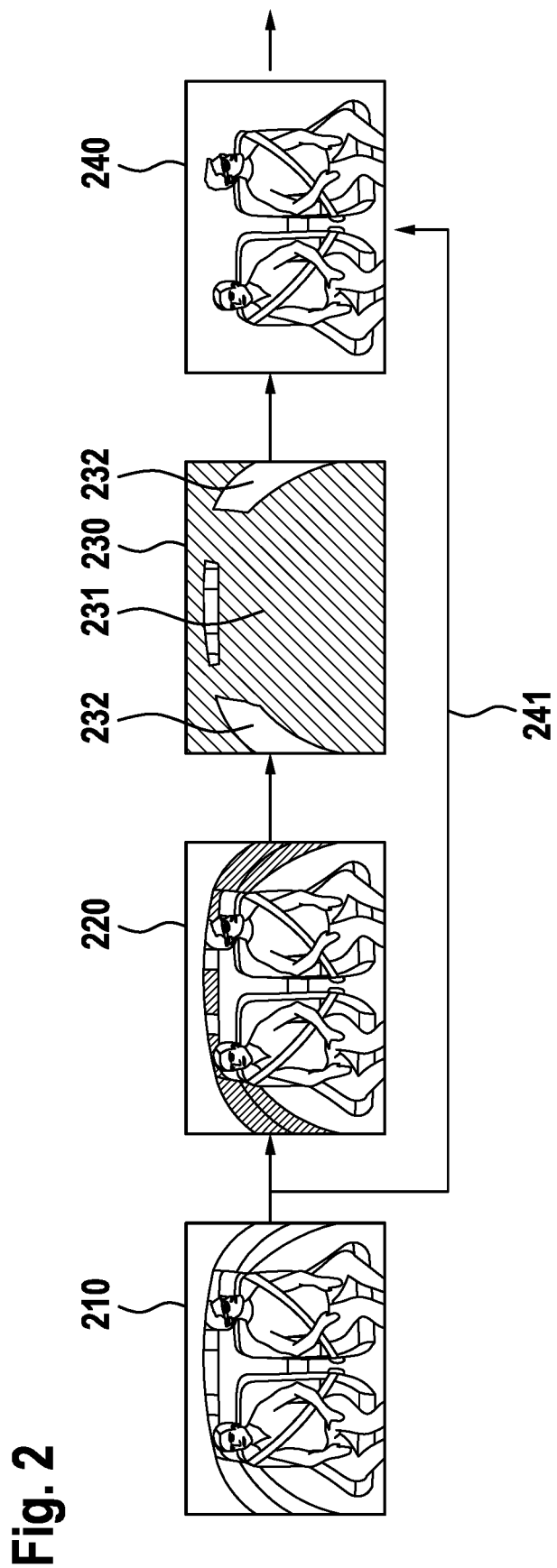
FIG. 2 shows exemplary images from the method for generating the monitoring image, in accordance with an example embodiment of the present invention.

FIG. 2 schematically shows exemplary images from the method for generating the monitoring image. Image 210 denotes an exemplary image of an image sequence from a vehicle interior in which the vehicle interior, persons, and windows of the vehicle are mapped. Image 220 outlines a periphery area with the hatched area of the window of the vehicle. And image 230 outlines a mask which may be mapped to the image of the image sequence to define a monitoring area 231 identified in black and a periphery area 232 identified in white. Image 240 outlines the resulting monitoring image in which the periphery area was masked, so that the area of the windows was assigned a uniform pixel value (e.g., black).

FIG. 3 schematically outlines a method 300 for training a learning-based semantic segmentation method in which a reference image 310, which is labeled with ground truth values 320, is provided to the input of a structure 350 for a learning-based semantic segmentation method and determines a monitoring area or a periphery area 330. In each training cycle, ground truth values 320 are compared S7 to the determined monitoring area or a periphery area 330, and the learning-based semantic segmentation method is adapted S8 to minimize a deviation from the particular live reference image or ground truth values 320.

What is claimed is:
1. A method for generating a monitoring image, comprising the following steps:
   providing an image sequence of surroundings to be monitored using an imaging system;

determining at least one monitoring area and at least one periphery area of at least one image of the image sequence using a learning-based semantic segmentation method;
compressing the monitoring area of the at least one image of the image sequence with a first compression quality; and
compressing the periphery area of the at least one image of the image sequence with a second compression quality to generate the monitoring image, the second compression quality being lower than the first compression quality, wherein a mask for a particular image is generated using the monitoring area and/or periphery area of the particular image, and the monitoring image is generated based on an averaged multitude of masks of a corresponding multitude of respective images of the image sequence.

2. The method as recited in claim 1, wherein the learning-based semantic segmentation method is carried out based on a trained neural convolutional network and/or an aggregate channel features method and/or an AdaBoost method.

3. The method as recited in claim 1, wherein the surroundings to be monitored are a vehicle interior.

4. The method as recited in claim 1, wherein the monitoring image is formed using the compressed monitoring area and the compressed periphery area.

5. The method as recited in claim 1, wherein the periphery area of the at least one image of the image sequence is compressed with the second compression quality in that the at least one periphery area is softened and/or assigned predefined pixel values for image pixels of the periphery area before the periphery area is compressed with the first compression quality using a compression method.

6. The method as recited in claim 1, wherein the periphery area of the at least one image of the image sequence is compressed with the second compression quality in that the at least one periphery area is replaced with a predefined image content.

7. The method as recited in claim 1, wherein at least one monitoring area and at least one periphery area are determined from a plurality of images of the image sequence using the learning-based semantic segmentation method.

8. The method as recited in claim 1, wherein image areas of the at least one image are segmented into a plurality of object classes using the learning-based semantic segmentation method, and the monitoring area and/or the periphery area is/are determined by assigning the image areas to the at least one monitoring area based on a first group of object classes, and by assigning image areas to the at least one periphery area based on a second group of object classes.

9. A method for training a learning-based semantic segmentation method for determining at least one monitoring area and at least one periphery area of at least one image of an image sequence, including a plurality of training cycles and a plurality of reference images of surroundings to be monitored using an imaging system, a particular reference image of the plurality of references images being assigned to a particular training cycle, and each training cycle including the following steps:
providing the particular reference image, at least one monitoring area and at least one periphery area being labeled in the particular reference image; and
adapting the learning-based semantic segmentation method to minimize a deviation from the particular labeled reference image during the determination of at least one monitoring area and at least one periphery area of the particular reference image using the learning-based semantic segmentation method, wherein a mask for a particular image is generated using the monitoring area and/or periphery area of the particular image, and the monitoring image is generated based on an averaged multitude of masks of a corresponding multitude of respective images of the image sequence.

10. The method as recited in claim 1, wherein: (i) based on the generated monitoring image, a control signal for controlling an at least semi-automated vehicle is provided, and/or (ii) based on the generated monitoring image, a warning signal for warning a vehicle occupant is provided, and/or (iii) based on the generated monitoring image, an emergency signal for alerting a private and/or public security service and/or rescue service is provided.

11. A monitoring device configured to generate a monitoring image, the monitoring device configured to:
provide an image sequence of surroundings to be monitored using an imaging system;
determine at least one monitoring area and at least one periphery area of at least one image of the image sequence using a learning-based semantic segmentation method;
compress the monitoring area of the at least one image of the image sequence with a first compression quality; and
compress the periphery area of the at least one image of the image sequence with a second compression quality to generate the monitoring image, the second compression quality being lower than the first compression quality, wherein a mask for a particular image is generated using the monitoring area and/or periphery area of the particular image, and the monitoring image is generated based on an averaged multitude of masks of a corresponding multitude of respective images of the image sequence.

12. A non-transitory machine-readable memory medium on which is stored a computer program for generating a monitoring image, the computer program, when executed by a computer, causing the computer to perform the following steps:
providing an image sequence of surroundings to be monitored using an imaging system;
determining at least one monitoring area and at least one periphery area of at least one image of the image sequence using a learning-based semantic segmentation method;
compressing the monitoring area of the at least one image of the image sequence with a first compression quality; and
compressing the periphery area of the at least one image of the image sequence with a second compression quality to generate the monitoring image, the second compression quality being lower than the first compression quality, wherein a mask for a particular image is generated using the monitoring area and/or periphery area of the particular image, and the monitoring image is generated based on an averaged multitude of masks of a corresponding multitude of respective images of the image sequence.

* * * * *